United States Patent [19]
Shioda et al.

[11] Patent Number: 5,912,073
[45] Date of Patent: Jun. 15, 1999

[54] BEARING MADE OF ABRASION-RESISTANT ALUMINUM ALLOY

[75] Inventors: Masahiko Shioda, Yokohama; Hiromi Taguchi, Aikawa; Shingo Hirotsu, Yamato; Yoshiteru Yasuda, Yokohama; Kenji Tsushima, Yokosuka, all of Japan

[73] Assignee: Nissan Motor Co., Ltd., Yokohama, Japan

[21] Appl. No.: 08/678,960

[22] Filed: Jul. 12, 1996

[30] Foreign Application Priority Data

Jul. 12, 1995 [JP] Japan .................................. 7-176381

[51] Int. Cl.⁶ ...................................................... B32B 5/16
[52] U.S. Cl. ........................ 428/323; 428/328; 428/331; 428/457; 428/446; 384/912; 384/913
[58] Field of Search ................................... 384/912, 913; 428/331, 328, 337, 457, 323, 446

[56] References Cited

U.S. PATENT DOCUMENTS

| | | | |
|---|---|---|---|
| 3,953,202 | 4/1976 | Rasmussen | 75/148 |
| 4,452,866 | 6/1984 | Kamiya | 428/653 |
| 4,937,149 | 6/1990 | Mori | 428/645 |

*Primary Examiner*—Timothy Speer
*Attorney, Agent, or Firm*—Foley & Lardner

[57] ABSTRACT

The invention relates to a bearing for supporting a moving member having a surface of a first arithmetical mean roughness. This bearing is made of an abrasion-resistant aluminum alloy containing 14.0–17.5 wt% of Si, 2.0–5.0 wt% of Cu, 0.1–1.0 wt% of Mg, 0.3–0.8 wt% of Mn, 0.1–0.3 wt% of Cr, 0.05–0.20 wt% of Ti, 0.003–0.05 wt% of P, not greater than 1.5 wt% of Fe, less than 0.005 wt% of Ca, and aluminum as a remainder. The aluminum alloy contains silicon primary crystals, and first and second intermetallic compounds. Each of the silicon primary crystals and these intermetallic compounds has an average particle diameter from 8 to 30 $\mu$m. The silicon primary crystals and the first and second intermetallic compounds respectively have first, second and third fractions each ranging from 5 to 40 $\mu$m in particle diameter. The total area of the first, second and third fractions on a two-dimensional section of the alloy is from 5 to 10% by area, based on the total area of the section. The bearing has a surface having a second arithmetical mean roughness which is greater than the first one and is from 0.3 to 3.0 $\mu$m. The bearing is superior in abrasion resistance, seizure resistance and running-in characteristic, and is capable of reducing abrasion even if used under a condition of inferior lubrication.

16 Claims, No Drawings

BEARING MADE OF ABRASION-RESISTANT ALUMINUM ALLOY

BACKGROUND OF THE INVENTION

The present invention relates to a bearing made of an aluminum alloy.

Recently, the application of aluminum alloy to power equipment has widely been examined for reducing the power equipment in weight. Of aluminum alloys, hyper-eutectic Al—Si alloy which is superior in abrasion resistance and seizure resistance has drawn attention in the application to the bearing part of a power equipment. A conventional hyper-eutectic Al—Si alloy is superior in abrasion resistance, but in some cases may be inferior in a so-called running-in (wearing-in) characteristic. Herein, running-in characteristic of a bearing material is defined as a quality thereof showing the extent to which a process for obtaining its mild abrasion proceeds. Furthermore, running-in of a bearing material is herein defined as an abrasion process thereof until its mild abrasion following its initial severe abrasion is obtained. In other words, if a bearing material is inferior in running-in characteristic, its initial severe abrasion continues and is not followed by its mild abrasion, during the frictional action of a moving member supported by the bearing, under a condition of inferior lubrication or under a condition where powder generated by abrasion (hereinafter referred to as "abrasion powder") is hardly removed from the interface between the bearing and the moving member. Thus, the abrasion powder remaining between the bearing and the moving member accelerates their abrasion and may cause abnormal abrasion thereof. In contrast, if a bearing material is superior in running-in characteristic, its initial severe abrasion is followed by its mild abrasion. During the initial severe abrasion, wavy and uneven surfaces of the bearing and of the moving member (e.g., shaft) wear away. With this, contact area between the bearing and the moving member increases, and thus the pressure exerted on the bearing by the moving member decreases and vice versa. In this way, the initial severe abrasion changes to the mild abrasion.

In general, a bearing made of a harder material relative to the moving member's material is inferior in the running-in characteristic. In view of this, there have been proposals to form a solid lubricant (e.g., lead, tin and molybdenum disulfide) layer on the bearing surface and to form an oil groove thereon for forcibly supplying oil. However, these proposals require additional steps and costs in the bearing preparation. Thus, there has been a demand for a bearing which is superior in abrasion resistance, seizure resistance and running-in characteristic, and is prepared without using these proposals.

SUMMARY OF THE INVENTION

It is therefore an object of the present invention to provide a bearing made of an aluminum alloy which is superior in abrasion resistance, seizure resistance and running-in characteristic, and which reduces abrasion even if used under a condition of inferior lubrication.

It is a more specific object of the present invention to provide a bearing made of a hyper-eutectic Al—Si alloy which is softer in hardness than a moving member supported by the bearing and thus is capable of being selectively more abraded than the moving member, which is capable of reducing the total amount of abrasion during running-in, which is capable of lowering abrasion (wear) rate during running-in, which is capable of improving lubrication, and which is capable of facilitating the removal of abrasion powder.

According to the present invention, there is provided a bearing for supporting a member which is intended to move relative to said bearing and has a surface having a first arithmetical mean roughness, said bearing being made of an abrasion-resistant aluminum alloy comprising: 14.0–17.5 wt% of Si, 2.0–5.0 wt% of Cu, 0.1–1.0 wt% of Mg, 0.3–0.8 wt% of Mn, 0.1–0.3 wt% of Cr, 0.05–0.20 wt% of Ti, 0.003–0.05 wt% of P, not greater than 1.5 wt% of Fe, less than 0.005 wt% of Ca, and aluminum as a remainder, wherein said aluminum alloy contains silicon primary crystals having an average particle diameter from 8 to 30 $\mu$m, a first intermetallic compound of aluminum, silicon and iron, and a second intermetallic compound of aluminum, silicon, iron, manganese and chromium, each of said first and second intermetallic compounds having an average particle diameter from 8 to 30 $\mu$m, wherein said silicon primary crystals and said first and second intermetallic compounds respectively have first, second and third fractions each ranging from 5 to 40 $\mu$m in particle diameter, wherein a total area of said first, second and third fractions on a two-dimensional section of said aluminum alloy is from 5 to 10% by area, based on the total area of said section, and wherein said bearing has a surface having a second arithmetical mean roughness which is greater than said first arithmetical mean roughness of said member and is from 0.3 to 3.0 $\mu$m, said first and second arithmetical mean roughnesses being in accordance with Japanese Industrial Standard JIS B 0601-1994.

Accordingly, an aluminum alloy of the present invention becomes superior in abrasion resistance, seizure resistance and running-in characteristic, and is capable of reducing abrasion even if used under a condition of inferior lubrication. An aluminum alloy of the present invention preferably further comprises at least one of boron in an amount of from 0.0001 to 0.01 wt% and nickel in an amount of from 0.3 to 3.0 wt%. With this, the bearing becomes further improved in mechanical characteristics such as strength.

DESCRIPTION OF THE PREFERRED EMBODIMENTS

As stated above, an abrasion-resistant aluminum alloy according to the present invention contains 14.0–17.5 wt% of Si. Si is an important element for improving the aluminum alloy in abrasion resistance. If it is less than 14.0 wt%, the alloy becomes insufficient in abrasion resistance. If it is greater than 17.5 wt%, the alloy's liquidus line becomes higher. With this, the alloy becomes inferior in fusibility and castability. Furthermore, the Si primary crystals tend to be non-uniformly dispersed and to be enlarged in size. Thus, the alloy becomes inferior in running-in characteristic.

The alloy further contains 2.0–5.0 wt% of Cu. Cu has a function to improve the alloy in strength, and thus improves the alloy in abrasion resistance. It is necessary to add at least 2.0 wt% of Cu in order to realize such function. However, if the Cu content is greater than 5.0 wt%, the alloy will have many shrinkage cavities.

The alloy further contains 0.1–1.0 wt% of Mg. Mg is an important element for improving the alloy in hardness, abrasion resistance, mechanical strength and the like. It is necessary to add at least 0.1 wt% of Mg in order to realize such improvement. However, if the Mg content is greater than 1.0 wt%, the alloy tends to become insufficient in toughness.

The alloy further contains 0.3–0.8 wt% of Mn. Mn has a function to finely uniformly disperse the second Al—Si—

Fe—Mn—Cr intermetallic compound in the alloy, thereby to improve the alloy in abrasion resistance, to strengthen the alloy matrix, and to improve the alloy in mechanical characteristics. If the Mn content is less than 0.3 wt%, the alloy tends to become insufficient in abrasion resistance. In contrast, if the Mn content is greater than 0.8 wt%, the alloy becomes inferior in mechanical characteristics.

The alloy further contains 0.1–0.3 wt% of Cr. Cr is an important element having a function to finely uniformly disperse the Si primary crystals in the alloy matrix. Cr is also an important element having a function to uniformly disperse the second Al—Si—Fe—Mn—Cr intermetallic compound as fine crystals in the alloy and to improve the alloy in abrasion resistance, hardness and mechanical characteristics. Such functions become remarkable, if the Cr content is at least 0.1 wt%. However, if the Cr content is greater than 0.3 wt%, the alloy becomes inferior in castability and mechanical characteristics.

The alloy further contains 0.05–0.20 wt% of Ti. Ti has a function to improve the alloy in mechanical characteristics and to make the alloy texture uniform. It is necessary to add at least 0.05 wt% of Ti in order to realize such function. However, if the Ti content is greater than 0.20 wt%, the alloy becomes inferior in mechanical strength.

The alloy further contains 0.003–0.05 wt% of P. P has a function to make the Si primary crystals fine in size and to uniformly disperse these crystals in the alloy, as well as Cr. Such crystals which are finely dispersed therein can be obtained, if the P content is at least 0.003 wt%. However, if the P content is greater than 0.05 wt%, the alloy becomes inferior in castability, causing run-out of molten material and the like.

The alloy further contains not greater than 1.5 wt% of Fe. Fe has a function to disperse the first Al—Si—Fe intermetallic compound and the second Al—Si—Fe—Mn—Cr intermetallic compound in the alloy and thus to improve the alloy in abrasion resistance. However, if too much amount of Fe is added to the alloy, an Al—Fe compound is formed particularly at a slowly cooled portion and a hot spot during casting, thereby to cause microporosity in a casting product. As a consequence, the obtained alloy becomes inferior in toughness and strength.

The alloy further contains less than 0.005 wt% of Ca. If the Ca content is not less than 0.005 wt%, the size of shrinkage cavity becomes too large during casting, thereby to lower castability.

Furthermore, too much amount of Ca impedes the phosphorus function of making the Si primary crystals fine in size.

The alloy further contains an optional element which is at least one of boron (B) in an amount of from 0.0001 to 0.01 wt% and nickel (Ni) in an amount of from 0.3 to 3.0 wt%. This optional element further improves the alloy in mechanical characteristics. Boron used as the optional element has a function to make the crystal grains fine in size, together with titanium, thereby to improve the alloy in strength and toughness. Such function of boron is realized, if at least 0.0001 wt% of B is added. Too much amount of B reduces the alloy in toughness.

Nickel used as the optional element improves the alloy in strength at high temperature and is an important element for improving the alloy in hardness and abrasion resistance. Such improvements are realized, if at least 0.3 wt% of Ni is added. The use of too much amount of Ni increases the production cost of the alloy, because Ni is high in price. Furthermore, as the Ni content increases, the alloy becomes inferior in corrosion resistance. Thus, the upper limit of the Ni content is set to be 3.0 wt% in the invention, and the function of Ni is totally or partly performed by Mn in the invention.

In the invention, the Si primary crystals contained in the alloy has an average particle diameter from 8 to 30 $\mu$m. Furthermore, each of the first Al—Si—Fe intermetallic compound and the second Al—Si—Fe—Mn—Cr intermetallic compound, which are contained in the alloy, has an average particle diameter from 8 to 30 $\mu$m, too. The Si primary crystals and the first and second intermetallic compounds improve the alloy in abrasion resistance, seizure resistance and running-in characteristic. Such improvement becomes inconspicuous, if the average particle diameter of each of the Si primary crystals and the first and second intermetallic compounds is less than 8 $\mu$m. If the average particle diameter of each of these is greater than 30 $\mu$m, the alloy is lowered in machinability, and the number of grains which come off a casting product of the alloy increases. In particular, if it is greater than 30 $\mu$m, there is provided an increase of the number of grains which come off a casting product of the alloy and remain between the bearing and the moving member. This increase causes abnormal abrasion.

In the invention, the Si primary crystals and the first and second intermetallic compounds respectively have first, second and third fractions each ranging from 5 to 40 $\mu$m in particle diameter. These first, second and third fractions improve the alloy in abrasion resistance, seizure resistance and running-in characteristic.

In the invention, the total area of the first, second and third fractions on a two-dimensional section of the alloy is from 5 to 10% by area, based on the total area of the section. If it is less than 5%, the above-mentioned improvements caused by the existence of the first, second and third fractions become inconspicuous. If it is greater than 10%, the alloy becomes inferior in machinability and running-in characteristic.

In the invention, the moving member has a first surface having a first arithmetical mean roughness, and the bearing has a second surface that supports the first surface of the moving member. The second surface has a second arithmetical mean roughness which is greater than the first arithmetical mean roughness and which is from 0.3 to 3.0 $\mu$m. If it is less than 0.3 $\mu$m, the second surface of the bearing becomes insufficient in roughness during an initial stage of the running-in. With this, the second surface will not have cavities which effectively store oil therein nor have grooves which effectively remove the abrasion powder therethrough. If it is greater than 3.0 $\mu$m, the true contact area between the bearing and the moving member becomes too small. With this, the pressure exerted on the bearing by the moving member and vice versa become too high. This tends to cause abnormal abrasion and seizure.

As stated above, the second arithmetical mean roughness of the bearing is greater than the first arithmetical mean roughness of the moving member. If the former is not greater than the latter, it becomes difficult to proceed the running-in where the contact area between the bearing and the moving member is increased and thus the pressure exerted on the bearing by the moving member and vice versa are reduced. With this, abrasive abrasion and abnormal abrasion may be caused.

The present invention will be illustrated with the following nonlimitative examples.

EXAMPLE 1

In this example, an ingot of an aluminum alloy A having a chemical composition which is shown in Table 1 was melted at 760° C. Then, the temperature of the molten metal was decreased to 710° C. Then, this molten metal was introduced into a mold heated at 200° C., thereby to obtain a platelike casting product having a thickness of 15 mm. In other words, the casting product was obtained by gravity casting.

TABLE 1

| Chemical Composition (wt %) | Alloy A | Alloy B | Alloy C |
|---|---|---|---|
| Si | 15.2 | 17.6 | 14.9 |
| Cu | 3.4 | 4.2 | 3.1 |
| Mg | 0.7 | 0.5 | 0.79 |
| Mn | 0.5 | 0.07 | 0.47 |
| Cr | 0.2 | — | 0.19 |
| Ti | 0.09 | 0.08 | 0.08 |
| P | 0.01 | 0.01 | 0.0073 |
| Fe | 0.12 | 0.13 | 0.85 |
| Ca | 0.001 | 0.002 | 0.004 |
| Al | Remainder | Remainder | Remainder |

Then, a platelike test piece having dimensions of 35 mm, 35 mm and 5 mm was prepared from the casting product by cutting, and was finished to have an arithmetical mean roughness which is shown in Table 2. The average particle diameter of the Si primary crystals and that of whole of the first Al—Si—Fe intermetallic compound and the second Al—Si—Fe—Mn—Cr intermetallic compound were measured, and the results are shown in Table. 2. Furthermore, there was measured the total area, on a two-dimensional section of the test piece, of first, second and third fractions which respectively range from 5 to 40 μm and respectively belong to the Si primary crystals and to the first and second intermetallic compounds, based on the total area of the section. The result is shown in Table 2.

TABLE 2

| | Alloy Type | Arith. mean roughness (μm) | Average Particle Dia. of Si Primary Crystals (μm) | Average Particle Dia. of Whole of 1st and 2nd Intermetallic Compounds (μm) | Total Area of 5–40 μm 1st to 3rd Fractions on Section (%) |
|---|---|---|---|---|---|
| Example 1 | Alloy A | 2.5 | 24.9 | 10.3 | 6.6 |
| Example 2 | Alloy C | 2.5 | 14.5 | 9.2 | 5.9 |
| Com. Ex. 1 | Alloy A | 0.25 | 24.9 | 10.3 | 6.6 |
| Com. Ex. 2 | Alloy A | 4.0 | 24.9 | 10.3 | 6.6 |
| Com. Ex. 3 | Alloy B | 2.5 | 38.2 | 4.3 | 13.6 |
| Com. Ex. 4 | Alloy C | 2.5 | 4.5 | 2.0 | 3.2 |

Furthermore, the test piece was subjected to a friction and abrasion test with a ring-on-plate Suzuki-type friction and abrasion tester. In this test, the test piece having dimensions of 35 mm, 35 mm and 5 mm was abraded by rotating an abrasion wheel at a rotation rate of 0.2 m/s, under a load of 350 kgf, using a lubricant (SAE 7.5W-30) having a temperature of 80° C. The abrasion wheel was made of a material of SUJ 2, and had an outer diameter of 25.6 mm, an inner diameter of 20.0 mm, a height of 15.0 mm, an arithmetical mean roughness of 0.8 μm and a hardness of about 60 in Rockwell C hardness. The friction coefficient's average during the initial 5 minutes of the test, and the total amount of abrasion in length after the test of 10 hr are shown in Table 3.

TABLE 3

| | Friction Coefficient Average | Total Amount of Abrasion after 10 hr Test (μm) |
|---|---|---|
| Example 1 | 0.09 | 9 |
| Example 2 | 0.10 | 12 |
| Com. Ex. 1 | 0.11 | 24 |
| Com. Ex. 2 | 0.16 | 30 |
| Com. Ex. 3 | 0.16 | 32 |
| Com. Ex. 4 | 0.14 | 52 |

EXAMPLE 2

In this example, Example 1 was slightly modified as follows. At first, an ingot of an aluminum alloy C having a chemical composition which is shown in Table 1 was melted at 760° C. Then, the temperature of the molten metal was decreased to 675° C. Then, this molten metal was introduced under a pressure of 80 MPa into a mold heated at 200° C., thereby to obtain a platelike casting product having a thickness of 15 mm. In other words, the casting product was obtained by die-casting. A test piece was prepared from the casting product by cutting in a manner that a plane having a depth of 0.6 mm measured from the casting product's surface becomes the test piece's surface. After cutting, the test piece was allowed to cool down.

COMPARATIVE EXAMPLE 1

In this comparative example, Example 1 was repeated except in that the test piece was finished to have an arithmetical mean roughness of 0.25 μm as shown in Table 2. It is understood from Table 3 that the results of Comparative Example 1 are larger than those of Examples 1–2 in friction coefficient average and the total amount of abrasion. It is considered that the test piece's surface did not have cavities which effectively store oil therein nor have grooves which effectively remove the abrasion powder therethrough, because the arithmetical mean roughness of the test piece was too small. Furthermore, it is considered that the running-in did not proceed satisfactorily during the friction and abrasion test, because the arithmetical mean roughness of the test piece was smaller than that of the abrasive wheel.

COMPARATIVE EXAMPLE 2

In this comparative example, Example 1 was repeated except in that the test piece was finished to have an arithmetical mean roughness of 4.0 μm as shown in Table 2. It is understood from Table 3 that the results of Comparative Example 2 are larger than those of Examples 1–2 in friction coefficient average and the total amount of abrasion. It is considered that the test piece's surface was too rough, and thus that the true contact area between the test piece and the abrasive wheel was too small. Therefore, it is considered that the pressure exerted on the test piece by the abrasive wheel and vice versa increased, and thus the total amount of abrasion of the test piece became large.

COMPARATIVE EXAMPLE 3

In this comparative example, Example 1 was slightly modified as follows. At first, an ingot of an aluminum alloy B having a chemical composition which is shown in Table 1 was melted at 760° C. Then, the temperature of the molten metal was decreased to 730° C. Then, this molten metal was introduced into a mold heated at 200° C., thereby to obtain a platelike casting product having a thickness of 15 mm. In other words, the casting product was obtained by gravity casting.

It is understood from Table 3 that the results of Comparative Example 3 are larger than those of Examples 1–2 in friction coefficient average and the total amount of abrasion. The Si primary crystals were not uniformly dispersed in the casting product. Furthermore, the average particle diameter of the Si primary crystals was very large, and the total areal percentage of the Si primary crystals on a section of the test piece was also very large. It is considered that these results with respect to the Si primary crystals were caused by the Si content of the alloy being too high and by the omission of Cr.

COMPARATIVE EXAMPLE 4

In this comparative example, Example 2 was repeated except in a test piece was prepared from the casting product of the alloy C by cutting in a manner that a plane having a depth of 0.3 mm measured from the casting product's surface becomes the test piece's surface.

It is understood from Table 3 that the results of Comparative Example 4 are larger than those of Examples 1–2 in friction coefficient average and the total amount of abrasion. It is considered that the Si primary crystals and the first and second intermetallic compounds were too small in average particle diameter and in the total areal percentage. Therefore, it is considered that these components contained in the alloy were not effective in increasing abrasion resistance, seizure resistance and running-in characteristic. It is considered that this has caused the result of the total amount of abrasion being high.

What is claimed is:

1. A bearing for supporting a member which is intended to move relative to said bearing and has a surface having a first arithmetical mean roughness, said bearing being made of an abrasion-resistant aluminum alloy comprising: 14.0–17.5 wt% of Si, 2.0–5.0 wt% of Cu, 0.1–1.0 wt% of Mg, 0.3–0.8 wt% of Mn, 0.1–0.3 wt% of Cr, 0.05–0.20 wt% of Ti, 0.003–0.05 wt% of P, not greater than 1.5 wt% of Fe, less than 0.005 wt% of Ca, and aluminum as a remainder, wherein said aluminum alloy contains silicon primary crystals having an average particle diameter from 8 to 30 $\mu$m, a first intermetallic compound of aluminum, silicon and iron, and a second intermetallic compound of aluminum, silicon, iron, manganese and chromium, each of said first and second intermetallic compounds having an average particle diameter from 8 to 30 $\mu$m, wherein said silicon primary crystals and said first and second intermetallic compounds respectively have first, second and third fractions each ranging from 5 to 40 $\mu$m in particle diameter, wherein a total area of said first, second and third fractions on a two-dimensional section of said aluminum alloy is from 5 to 10% by area, based on the total area of said section, and wherein said bearing has a surface having a second arithmetical mean roughness which is greater than said first arithmetical mean roughness of said member and is from 0.3 to 3.0 $\mu$m, said first and second arithmetical mean roughnesses being in accordance with Japanese Industrial Standard JIS B 0601-1994.

2. A bearing according to claim 1, wherein said alloy further comprises at least one element selected from the group consisting of boron in an amount of from 0.0001 to 0.01 wt% and nickel in an amount of from 0.3 to 3.0 wt%.

3. A bearing according to claim 1, wherein said bearing is prepared by casting.

4. A bearing according to claim 3, wherein said casting is a gravity casting.

5. A bearing according to claim 3, wherein said casting is a die-casting.

6. A bearing according to claim 1, wherein said alloy comprises from 14.9 to 15.2 wt% of Si.

7. A bearing according to claim 1, wherein said alloy comprises from 3.1 to 3.4 wt% of Cu.

8. A bearing according to claim 1, wherein said alloy comprises from 0.7 to 0.79 wt% of Mg.

9. A bearing according to claim 1, wherein said alloy comprises from 0.47 to 0.5 wt% of Mn.

10. A bearing according to claim 1, wherein said alloy comprises from 0.19 to 0.2 wt% of Cr.

11. A bearing according to claim 1, wherein said alloy comprises from 0.08 to 0.09 wt% of Ti.

12. A bearing according to claim 1, wherein said alloy comprises from 0.0073 to 0.01 wt% of P.

13. A bearing according to claim 1, wherein said alloy comprises from 0.12 to 0.85 wt% of Fe.

14. A bearing according to claim 1, wherein said alloy comprises from 0.001 to 0.004 wt% of Ca.

15. A bearing according to claim 1, wherein said alloy comprises from 73.65 to 83.45 wt% of Al.

16. A bearing according to claim 1, wherein said alloy comprises from 79.61 to 79.78 wt% of Al.

* * * * *